(12) United States Patent
Petrakivskyi et al.

(10) Patent No.: US 12,301,040 B2
(45) Date of Patent: May 13, 2025

(54) METHOD OF CHARGING PLURALITY OF BATTERY CELLS AND CONTROLLER FOR PERFORMING THE METHOD

(71) Applicant: Samsung Electronics Co., Ltd., Suwon-si (KR)

(72) Inventors: Oleg Petrakivskyi, Zhytomyr (UA); Oleksandr Baiev, Zaporizhzhia (UA); Denys Zakutailo, Kyiv (UA); Ivan Doroshenko, Chernihiv (UA); Kostyantyn Slyusarenko, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 789 days.

(21) Appl. No.: 17/538,177

(22) Filed: Nov. 30, 2021

(65) Prior Publication Data

US 2023/0035894 A1 Feb. 2, 2023

(30) Foreign Application Priority Data

Jul. 28, 2021 (KR) ........................ 10-2021-0099293

(51) Int. Cl.
*H02J 7/00* (2006.01)

(52) U.S. Cl.
CPC ........ *H02J 7/00712* (2020.01); *H02J 7/0014* (2013.01); *H02J 7/0016* (2013.01);
(Continued)

(58) Field of Classification Search
CPC .... H02J 7/0014; H02J 7/0029; H02J 7/00711; H02J 7/00712; H02J 2207/20;
(Continued)

(56) References Cited

U.S. PATENT DOCUMENTS 10,224,575 B2 * 3/2019 Shin ................... H01M 10/425
10,374,441 B2 8/2019 Wang et al.
(Continued)

FOREIGN PATENT DOCUMENTS

CH 713196 A2 * 6/2018
CN 205646993 U * 10/2016
(Continued)

OTHER PUBLICATIONS

Gogoana, Radu, et al. "Internal resistance matching for parallel-connected lithium-ion cells and impacts on battery pack cycle life," Journal of Power Sources 252, Dec. 10, 2013, pp. 8-16 (6 pages in English).

(Continued)

*Primary Examiner* — Nathaniel R Pelton
(74) *Attorney, Agent, or Firm* — NSIP Law

(57) ABSTRACT

A battery charging circuit for charging batteries includes a first switch connected in series between a first pole of a power supply and a first pole of the first battery cell, a second switch connected in parallel between the first pole of the first battery cell and a second pole of the first battery cell configured to adjust a size of a current applied to the first battery cell, a third switch connected in parallel between a first pole of the second battery cell and a second pole of the second battery cell, the third switch being configured to adjust a size of a current applied to the second battery cell, and a fourth switch connected in series between the second pole of the first battery cell and the first pole of the second battery cell.

20 Claims, 10 Drawing Sheets

(52) U.S. Cl.
CPC .......... *H02J 7/0029* (2013.01); *H02J 7/0047* (2013.01); *H02J 7/00711* (2020.01); *H02J 7/0013* (2013.01); *H02J 7/0031* (2013.01)

(58) Field of Classification Search
CPC ...... H02J 7/0013; H02J 7/0016; H02J 7/0031; H02J 7/0071; H02J 7/0047; B60L 2200/36; B60L 2210/10; B60L 2240/547
USPC .......................................................... 320/119
See application file for complete search history.

(56) References Cited

U.S. PATENT DOCUMENTS

| | | | |
|---|---|---|---|
| 2009/0085515 A1 | 4/2009 | Bourilkov et al. | |
| 2011/0006731 A1* | 1/2011 | Wang | B60L 53/14 |
| | | | 320/109 |
| 2016/0248125 A1 | 8/2016 | Huang et al. | |
| 2016/0248266 A1 | 8/2016 | Ferrese et al. | |
| 2017/0201102 A1 | 7/2017 | Hikosaka | |
| 2017/0214246 A1 | 7/2017 | Wang et al. | |
| 2020/0052349 A1 | 2/2020 | Aikens | |
| 2020/0127467 A1* | 4/2020 | Li | H02J 7/342 |
| 2020/0153262 A1* | 5/2020 | Yoon | H02J 7/0048 |
| 2020/0225288 A1* | 7/2020 | Park | G01R 31/367 |

FOREIGN PATENT DOCUMENTS

| | | |
|---|---|---|
| CN | 107408824 B | 4/2020 |
| EP | 2 434 609 A2 | 3/2012 |
| GB | 2545700 A | 6/2017 |
| WO | WO 2016/133720 A3 | 8/2016 |

OTHER PUBLICATIONS

Badam, Anirudh, et al. "Software-Defined Batteries," Communications of the ACM vol. 59 No. 12, pp. 111-119, Dec. 2016 (9 pages in English).

Cha, Dae-Seak, et al. "Hot-Swappable Modular Converter System Control for Heterogeneous Batteries and ESS," Energies 2018, vol. 11, No. 309, pp. 1-19, Feb. 1, 2018 (19 pages in English).

Vidhya, S. Devi, et al. "Hybrid fuzzy PI controlled multi-input DC/DC converter for electric vehicle application" Journal for Control, Measurement, Electronics, Computing and Communications, Automatika 2020, vol. 61, No. 1, pp. 79-91, Nov. 7, 2019 (14 pages in English).

* cited by examiner

METHOD OF CHARGING PLURALITY OF BATTERY CELLS AND CONTROLLER FOR PERFORMING THE METHOD

CROSS-REFERENCE TO RELATED APPLICATIONS

This application claims the benefit under 35 USC § 119(a) of Korean Patent Application No. 10-2021-0099293, filed on Jul. 28, 2021, at the Korean Intellectual Property Office, the entire disclosure of which is incorporated herein by reference for all purposes.

BACKGROUND

1. Field

The following description relates to a technology for charging battery cells.

2. Description of Related Art

Batteries may be charged by various methods. For example, a constant current-constant voltage (CC-CV) charging method may charge a battery with CC and charge the battery at a constant voltage when a voltage of the battery reaches a preset level. For example, a varying current decay charging method may charge a battery at a low state of charge (SOC) with high current and gradually reduce the currents when the battery has a preset SOC by the charging. In addition to the described methods, a multi-step charging method may charge a battery with CC, and a pulse charging method may charge a battery by repeatedly applying pulse currents at short time intervals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of charging a plurality of battery cells by controlling a battery charging circuit connected to the plurality of battery cells, the method including obtaining first state information for a first battery cell of the plurality of battery cells and second state information for a second battery cell of the plurality of battery cells, determining a first charging profile for the first battery cell based on the first state information and determining a second charging profile for the second battery cell based on the second state information, determining a first mode for charging the first battery cell based on the first charging profile and determining a second mode for charging the second battery cell based on the second charging profile, and controlling the battery charging circuit by controlling at least one of a first switch, a second switch, a third switch, and a fourth switch based on the first mode and the second mode, wherein the battery charging circuit includes the first switch being connected in series between a first pole of a power supply and a first pole of the first battery cell, the second switch being connected in parallel between the first pole of the first battery cell and a second pole of the first battery cell, the second switch being configured to adjust a size of a current applied to the first battery cell, the third switch being connected in parallel between a first pole of the second battery cell and a second pole of the second battery cell, the third switch being configured to adjust a size of a current applied to the second battery cell, the third switch connecting in series between the second pole of the first battery cell and a ground connected to the second pole of the second battery cell, and a second pole of the power supply connected to the ground, and the fourth switch being connected in series between the second pole of the first battery cell and the first pole of the second battery cell.

The obtaining each of the first state information for the first battery cell and the second state information for the second battery cell may include obtaining the first state information by modeling a physical phenomenon in the first battery cell and the second battery cell, respectively, using a battery model.

The method may include dividing a charging process of the first battery cell into charging stages, wherein the first charging profile may include information for charging the first battery cell with at least one of a charging current or a charging voltage corresponding to each charging stage of the charging stages.

The controlling of the battery charging circuit may include generating a first pulse width modulation (PWM) signal to control the second switch such that the first battery cell may be charged in the first mode, and controlling the second switch based on the first PWM signal.

The controlling of the battery charging circuit may include determining whether a first charging current value for charging the first battery cell corresponds to a first threshold current value, and terminating charging of the first battery cell, in response to the first charging current value corresponds to the preset first threshold current value.

The method may include generating circuit safety information by measuring at least one of a current, a voltage, and a temperature applied to the battery charging circuit using at least one sensor, and opening the battery charging circuit through a protection switch of the battery charging circuit, in response to the circuit safety information being greater than a threshold.

In another general aspect, there is provided a battery charging device, including a battery charging circuit connected to a first battery cell and a second battery cell, and a controller configured to control the battery charging circuit, wherein the battery charging circuit may include a first switch connected in series between a first pole of a power supply and a first pole of the first battery cell, a second switch connected in parallel between the first pole of the first battery cell and a second pole of the first battery cell configured to adjust a size of a current applied to the first battery cell, a third switch connected in parallel between a first pole of the second battery cell and a second pole of the second battery cell, the third switch being configured to adjust a size of a current applied to the second battery cell, the third switch connecting in series between the second pole of the first battery cell and a ground connected to the second pole of the second battery cell and a second pole of the power supply connected to the ground, and a fourth switch connected in series between the second pole of the first battery cell and the first pole of the second battery cell.

The controller may include a microprocessor.

The first battery cell and the second battery cell are heterogeneous.

The first battery cell and the second battery cell each have a different capacity.

The first battery cell and the second battery cell are connected in series by the fourth switch closing during charging.

A voltage applied to both poles of the power supply may be a sum of a voltage of the first battery cell and a voltage of the second battery cell, in response to the first battery cell and the second battery cell being connected in series.

The controller may be configured to generate a first pulse width modulation (PWM) signal configured to charge the first battery cell and a second PWM signal configured to charge the second battery cell, and independently control the second switch and the third switch based on the first PWM signal and the second PWM signal.

The battery charging circuit may include a first low-pass filter configured to reduce a voltage ripple that appears by the second switch being controlled based on the first PWM signal, the first low-pass filter may include a coil and a capacitor.

The first low-pass filter may include a diode configured to prevent a reverse current.

The battery charging circuit may include a protection switch, at least one sensor configured to generate circuit safety information by measuring at least one of a current, a voltage, or a temperature applied to the battery charging circuit, and a circuit protection module configured to open the battery charging circuit through the protection switch, in response to the circuit safety information being greater than a threshold.

The battery charging circuit may include a balancing circuit for the first battery cell and the second battery cell, wherein the balancing circuit may include a first balance diode connected to the first battery cell, a second balance diode connected to the second battery cell, and a load, wherein the controller may be configured to control the first balance diode and the second balance diode through a diode enable signal.

The battery charging device may be included in a vehicle or a mobile terminal.

Other features and aspects will be apparent from the following detailed description, the drawings, and the claims.

Figure 1:
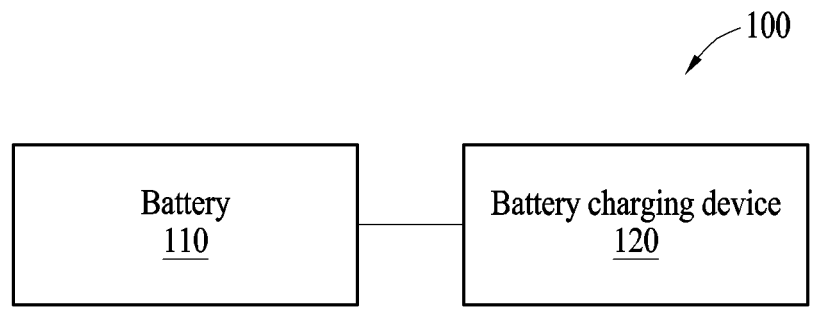
FIG. 1 illustrates an example of a battery system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The use of the term "may" herein with respect to an example or embodiment (e.g., as to what an example or embodiment may include or implement) means that at least one example or embodiment exists where such a feature is included or implemented, while all examples are not limited thereto.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

FIG. 1 illustrates an example of a battery system.

Referring to FIG. 1, a battery 110 may be one or more of battery cells, battery modules, or battery packs. The battery 110 may include a capacitor, a secondary battery, or a lithium-ion battery for storing power obtained by charging. A device employing the battery 110 may receive power from the battery 110.

A battery charging device 120 may charge the battery 110 using a battery model. For example, the battery charging device 120 may fast charge the battery 110 in a multi-step charging manner that minimizes charging aging by using an estimate of the internal state of the battery based on the battery model. Here, the battery model may be an electrochemical model to which aging parameters of the battery 110 are applied to estimate state information of the battery 110 by modeling physical phenomena such as potential and ion concentration distribution in the battery 110. In addition, the internal state of the battery 110 may include any one or any combination of factors such as, for example, a cathode lithium-ion concentration distribution, an anode lithium-ion concentration distribution, an electrolyte lithium-ion concentration distribution, a cathode potential, and an anode potential of the battery 110. For example, the aging parameters may include any one or any combination of an electrode balance shift, a capacity for cathode active material, and an anode surface resistance of the battery 110, but are not limited thereto.

The battery charging device 120 may divide the charging process into several charging stages (or steps) and charge the battery 110 with a charging current and voltage corresponding to each charging stage. For each of the charging stages, a charging limit condition for limiting charging of the battery 110 to a target charging capacity during a target charging time to prevent aging of the battery 110 may be set.

For example, the charging limit condition may include internal state conditions of the battery 110 for the respective charging stages. The internal state conditions may be defined by the electrochemical model based on at least one internal state that affects the aging of the battery 110. The internal state conditions may include any one or any combination of an anode overpotential condition, a cathode overpotential condition, an anode surface lithium-ion concentration condition, a cathode surface lithium-ion concentration condition, a cell voltage condition, and a state of charge (SOC) condition for the battery 110.

Since the battery 110 may be aged when one of the internal state conditions is reached as the battery 110 is being charged, the battery charging device 120 may control the charging of the battery 110 using the internal state conditions. For example, if the battery 110 is aged when the anode overpotential of the battery 110 falls below 0.005 volts (V), the anode overpotential condition may be set based on 0.005 V. Aging conditions may be conditions that cause aging when an internal state of the battery 110 is reached. Here, the anode overpotential of 0.005 V may be an aging condition that causes aging when the anode overpotential of the battery 110 is reached. However, the internal state conditions are not limited to the examples described above, and various expressions quantifying an internal state that affect the aging of the battery 110 may be employed.

Overpotential may be a voltage drop caused by a departure from the equilibrium potential associated with an intercalation/deintercalation reaction at each electrode of the battery 110. When a material in an active material of each electrode of the battery 110 is lithium-ions, the lithium-ion concentration described above may be a concentration of lithium-ions. Materials other than lithium-ions may be employed as the material in the active material.

An SOC may be a parameter indicating a charging state of the battery 110. The SOC may indicate an amount of energy stored in the battery 110, and the amount may be expressed in percent (%), for example, 0% to 100%. For example, 0% may indicate a fully discharged state, and 100% may indicate a fully charged state. Such a metric may be variously modified for various types, for example, defined depending on a design intention or an aspect of a particular type. The SOC may be estimated or measured using various schemes.

In an example, the battery 110 may include two electrodes (e.g., cathode and anode) for intercalation/deintercalation of lithium-ions, an electrolyte that is a medium through which lithium-ions may move, a separator that physically separates the cathode and the anode to prevent direct flow of electrons but allow ions to pass therethrough, and a collector that collects electrons generated by an electrochemical reaction or supplies electrons required for an electrochemical reaction. The cathode may include a cathode active material, and the anode may include an anode active material. For example, lithium cobalt oxide ($LiCoO_2$) may be used as the cathode active material, and graphite (C6) may be used as the anode active material. Lithium-ions may move from the cathode to the anode while the battery 110 is charged and move from the anode to the cathode while the battery 110 is being discharged. Thus, the concentration of lithium-ions in the cathode active material and the anode active material may change in response to charging and discharging.

The electrochemical model may be employed by various methods to express the internal state of the battery 110. For example, in addition to various application models, a single particle model (SPM) may be employed for the electrochemical model, and parameters defining the electrochemical model may be variously modified depending on a design intention. The internal state conditions may be derived from the electrochemical model of the battery 110 or may be derived using empirical measurement. Here, a technique of defining the internal state conditions is not limited.

The charging limit condition may include a maximum charging time for the respective charging stages. The maximum charging time may be a condition of a maximum time required to charge the battery 110 with a charging current of a corresponding charging stage.

The charging limit condition may include anode potential limits for the respective charging stages. The anode potential of the battery 110 may decrease as the battery 110 is charged, and the anode potential limit may refer to the minimum anode potential allowed in the corresponding charging stage.

As described above, the internal state conditions and/or the charging limit conditions for the respective charging stages may be charging conditions set to achieve two objectives, preventing aging of the battery 110 and charging the battery by a target charging capacity during a target charging time.

According to the charging control by the battery charging device 120, a charging stage of the battery 110 may be switched from a first charging stage to a second charging stage at a point in time when the internal state of the battery 110 reaches one of the internal state conditions or the charging time of the battery 110 reaches a maximum charging time while the battery 110 is being charged with a first charging current or voltage in the first charging stage. This process may be iteratively performed until the final charging stage.

In an example, when the battery 110 includes a plurality of heterogeneous battery cells (e.g., battery cells with different capacities), methods for charging the plurality of battery cells in an effective and a well-balanced manner may need to be considered. For example, when the plurality of battery cells is collectively connected in parallel or in series to a direct current (DC)/DC converter, the battery cells may not be charged in an effective and a well-balanced manner.

Hereinafter, a method of charging a plurality of battery cells using the battery charging device 120 for which a circuit structure is changed will be described in detail with reference to FIGS. 2 through 7 below.

Figure 2:
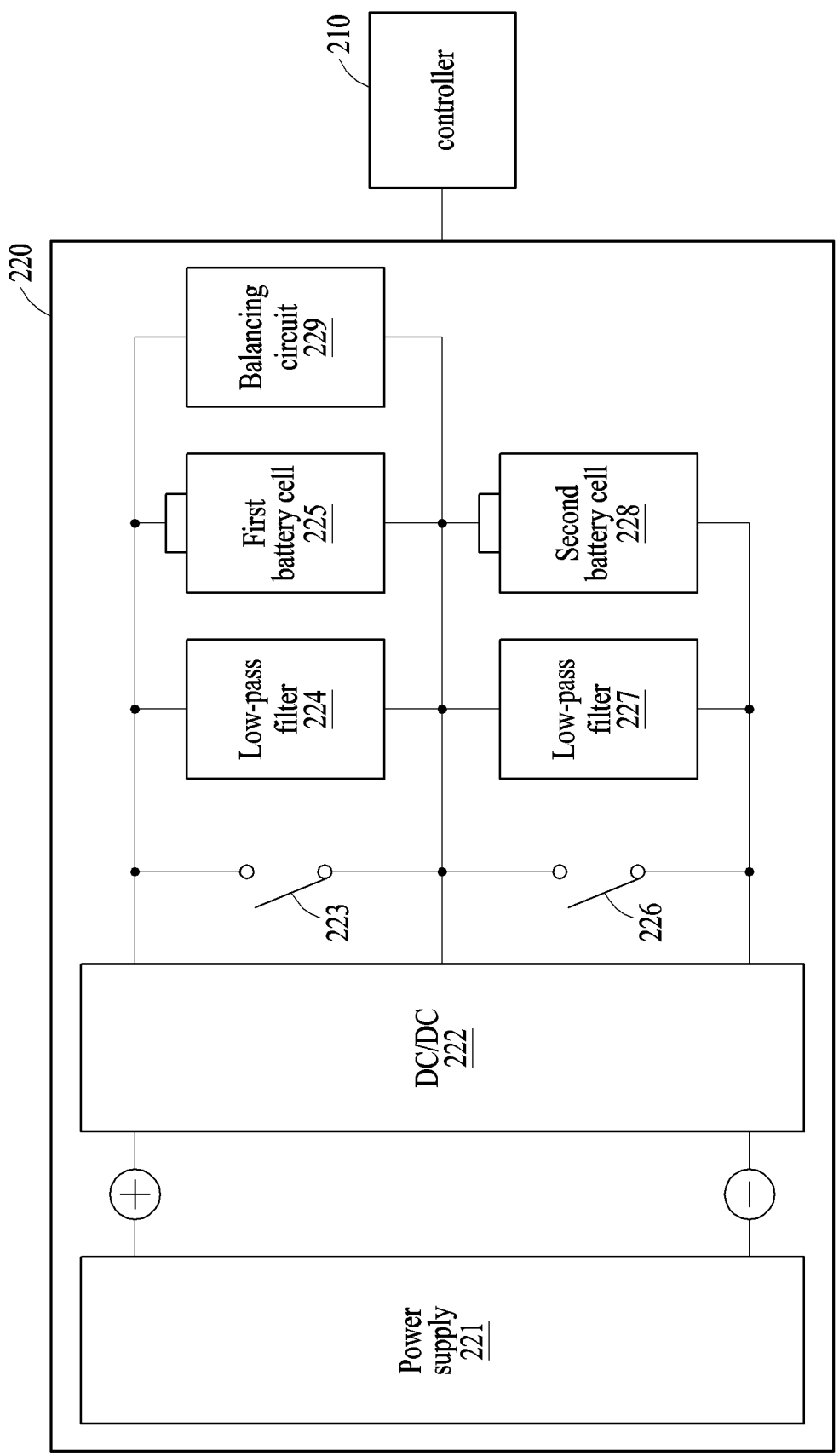
FIG. 2 illustrates an example of a battery charging device.

FIG. 2 illustrates an example of a battery charging device.

The battery charging device 120 described above with reference to FIG. 1 may include a controller and a battery charging circuit 220.

For example, the controller 210 may be a microprocessor or an electronic device including a processor.

For example, the battery charging circuit 220 may include a power supply 221, a DC/DC converter 222, a plurality of switches 223 and 226 that may change a structure of the battery charging circuit 220, a first battery cell 225, a first low-pass filter 224 for the first battery cell 225, a second battery cell 228, a second low-pass filter 227 for the second battery cell 228, and a balancing circuit 229. In an example, the power supply 221 may be separated from the battery charging circuit 220.

Each element of the battery charging circuit 220 is described in detail with reference to FIG. 4 below.

Figure 3:
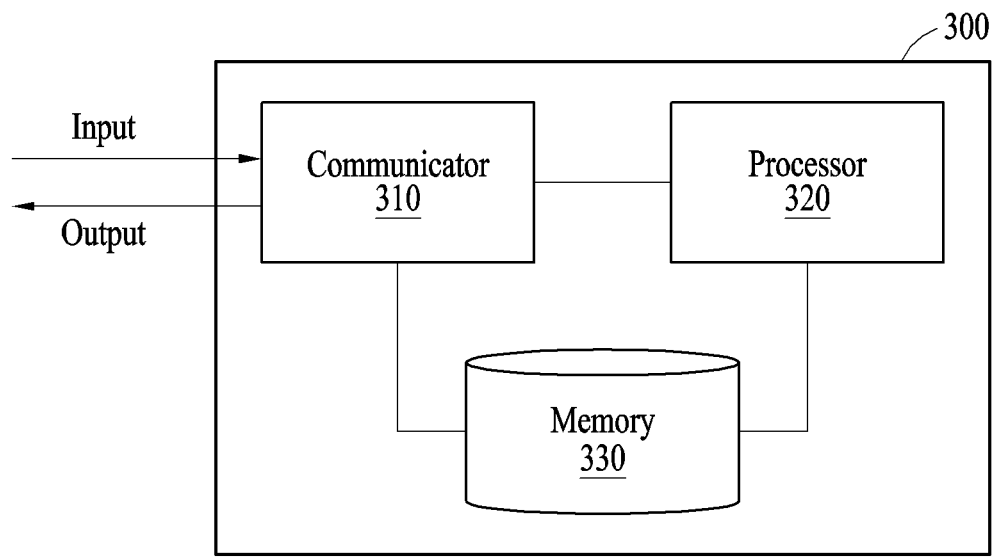
FIG. 3 illustrates an example of a controller.

FIG. 3 illustrates an example of a controller.

A controller 300 for controlling a battery charging circuit may include a communicator 310, a processor 320, and a memory 330. For example, the controller 300 may correspond to the controller 210 of the battery charging device described above with reference to FIG. 2.

In an example, the controller 300 may be included in a mobile communication terminal.

In another example, the controller 300 may be included in a vehicle.

The communicator 310 may be connected to the processor 320 and the memory 330 for transmitting and receiving data to and from the processor 320 and the memory 330. The communicator 310 may be connected to another external device and transmit and receive data to and from the external device. In an example, transmitting and receiving "A" may refer to transmitting and receiving "information or data indicating A."

The communicator 310 may be implemented as circuitry in the controller 300. For example, the communicator 310 may include an internal bus and an external bus. In another example, the communicator 310 may be an element that connects the controller 300 to the external device. The communicator 310 may be an interface. The communicator 310 may receive data from the external device and transmit the data to the processor 320 and the memory 330.

The processor 320 may process data received by the communicator 310 and data stored in the memory 330. A "processor" may be a hardware-implemented processing device having a physically structured circuit to execute desired operations. For example, the desired operations may include instructions or a code in a program. For example, the hardware-implemented data processing device may include a microprocessor, a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a microcomputer, a processor core, a multi-core processor, a multiprocessor, a central processing unit (CPU), an application-specific integrated circuit (ASIC), a field-programmable gate array (FPGA), a graphics processing unit (GPU), a neural processing unit (NPU), a tensor processing unit (TPU), a digital signal processor (DSP), a controller and an arithmetic logic unit (ALU), an application processor (AP), a neural processing unit (NPU), or a programmable logic unit (PLU).

The processor 320 may execute a computer-readable code (e.g., software) stored in the memory 330 and instructions induced by the processor 320.

The memory 330 may store the data received by the communicator 310 and data processed by the processor 320. For example, the memory 330 may store the program (or an application, or software). For example, the stored program may be a set of syntaxes that are coded and executable by the processor 320 to generate a charging path for a battery. In another example, the stored program may be a set of syntaxes that are coded and executable by the processor 320 to determine a charging limit condition of a battery. Further description of the processor 320 is provided below.

The memory 330 may include, for example, at least one volatile memory, non-volatile memory, random-access memory (RAM), flash memory, a hard disk drive, dynamic random-access memory (DRAM), a static random access memory (SRAM), a thyristor RAM (T-RAM), a zero capacitor RAM (Z-RAM), a twin transistor RAM (TTRAM), and an optical disk drive. Further description of the memory 330 is provided below.

The memory 330 may store an instruction set (e.g., software) for operating the controller 300. The instruction set for operating the controller 300 may be executed by the processor 320.

The communicator 310, the processor 320, and the memory 330 are described in detail with reference to FIGS. 5 and 6 below.

Figure 4:
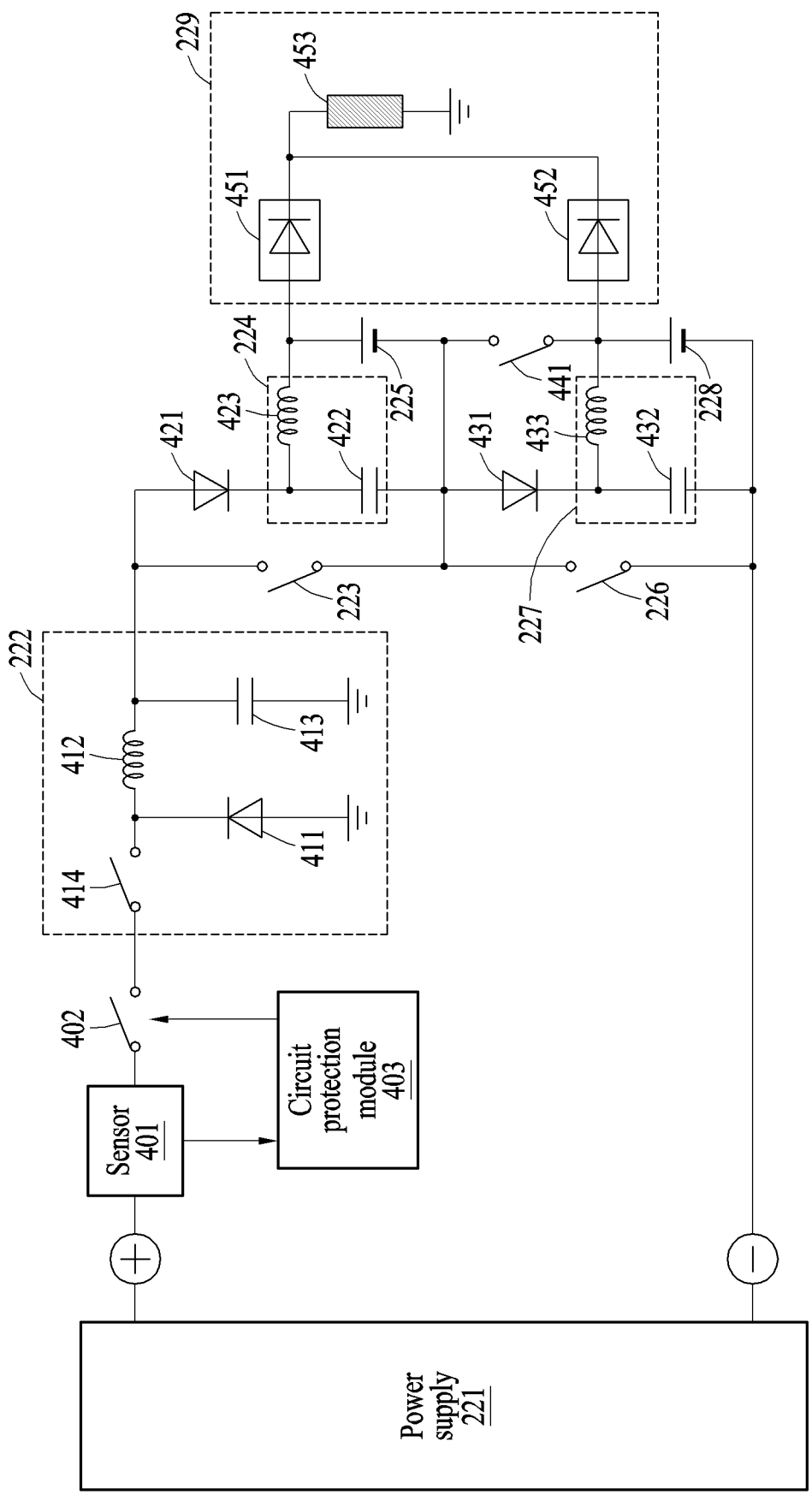
FIG. 4 illustrates an example of a battery charging circuit.

FIG. 4 illustrates an example of a battery charging circuit.

A controller, for example, the controller 210 in FIG. 2 or the controller 300 in FIG. 3, may control elements of the battery charging circuit, for example, the battery charging circuit 220 in FIG. 2.

The battery charging circuit 220 may further include a sensor 401, a protection switch 402, and a circuit protection module 403. For example, the sensor 401 may sense a voltage and/or a current applied to the entire battery charging circuit 220. In another example, the sensor 401 may sense a temperature of the battery charging circuit 220. The sensor 401 may generate circuit safety information by measuring at least one of a current, a voltage, and a temperature applied to the battery charging circuit 220. When a value sensed by the sensor 401, that is, circuit safety information, exceeds a threshold, the circuit protection module 403 may open the protection switch 402 and open the battery charging circuit 220. The battery charging circuit 220 may be protected through the circuit protection module 403.

The DC/DC converter 222 may include a first diode 411, a first coil 412, a first capacitor 413, and a first switch 414. The DC/DC converter 222 may be a common current/voltage limiter. The first switch 414 may be connected in series between a first pole of the power supply 221 and a first pole of the first battery cell 225. For example, the controller may generate a common pulse width modulation (PWM) signal for controlling the first switch 414. A voltage or a current applied to the battery charging circuit 220 may be adjusted through a duty ratio of the first switch 414 based on the common PWM signal.

The first low-pass filter 224 may include a second diode 421, a second capacitor 422, and a second coil 423. The second switch 223 may be connected in parallel between the first pole of the first battery cell 225 and a second pole of the first battery cell 225 to adjust a size of a current applied to the first battery cell 225. For example, the second switch 223 may be controlled through a first PWM signal generated by the controller, and a voltage or a current applied to the first battery cell 225 through the duty ratio based on the first PWM signal of the second switch 223 may be adjusted. A method of generating the first PWM signal is described further below with reference to FIG. 5. Voltage ripples that may appear by the PWM control of the second switch 223 through the first low-pass filter 224 may be reduced. The second diode 421 may be positioned between the second switch 223 and the first low-pass filter 224 for preventing a reverse current.

The second low-pass filter 227 may include a third diode 431, a third capacitor 432, and a third coil 433. The third switch 226 may be connected in parallel between a first pole of the second battery cell 228 and a second pole of the second battery cell 228 to adjust a size of a current applied to the second battery cell 228. For example, the third switch 226 may be controlled through a second PWM signal generated by the controller, and a voltage or a current applied to the second battery cell 228 through the duty ratio of the third switch 226 based on the second PWM signal may be adjusted. A method of generating the second PWM signal will be described further below with reference to FIG. 5. The third switch 226 may connect in series the second pole of the first battery cell 225 and a ground connected to the second pole of the second battery cell 228, and a second pole of the power supply 221 may be connected to the ground. The voltage ripples that may appear as a result of controlling the third switch 226 by PWM control through the second low-pass filter 227 may be reduced.

The balancing circuit 229 may include a first balancing diode 451 connected to the first battery cell 225, a second balancing diode 452 connected to the second battery cell 228, and a load 453. The controller may control the first balance diode 451 and the second balance diode 452 through a diode enable signal. The controller may generate the diode enable signal for each of the first battery cell 225 and the second battery cell 228 for controlling the balance of the first battery cell 225 and the second battery cell 228 during charging and/or discharging.

The battery charging circuit 220 may further include a fourth switch 441 that may connect in series the first battery cell 225 and the second battery cell 228. For example, the fourth switch 441 may be connected in series between the second pole of the first battery cell 225 and the first pole of the second battery cell 228. For example, when the fourth switch 441 is closed during charging, the first battery cell 225 and the second battery cell 228 may be connected in series. When the first battery cell 225 and the second battery cell 228 are connected in series, a voltage applied to both poles of the power supply 221 may be a sum of a voltage of the first battery cell 225 and a voltage of the second battery cell 228 connected in a first series.

In another example, when the fourth switch 441 is closed, a voltage output achieved by connecting in series the first battery cell 225 and the second battery cell 228 compared to a voltage output achieved by connecting in parallel the first battery cell 225 and the second battery cell 228 may be higher. For example, when the first battery cell 225 and the second battery cell 228 are connected in parallel during discharging, a high voltage may be output.

Figure 5:
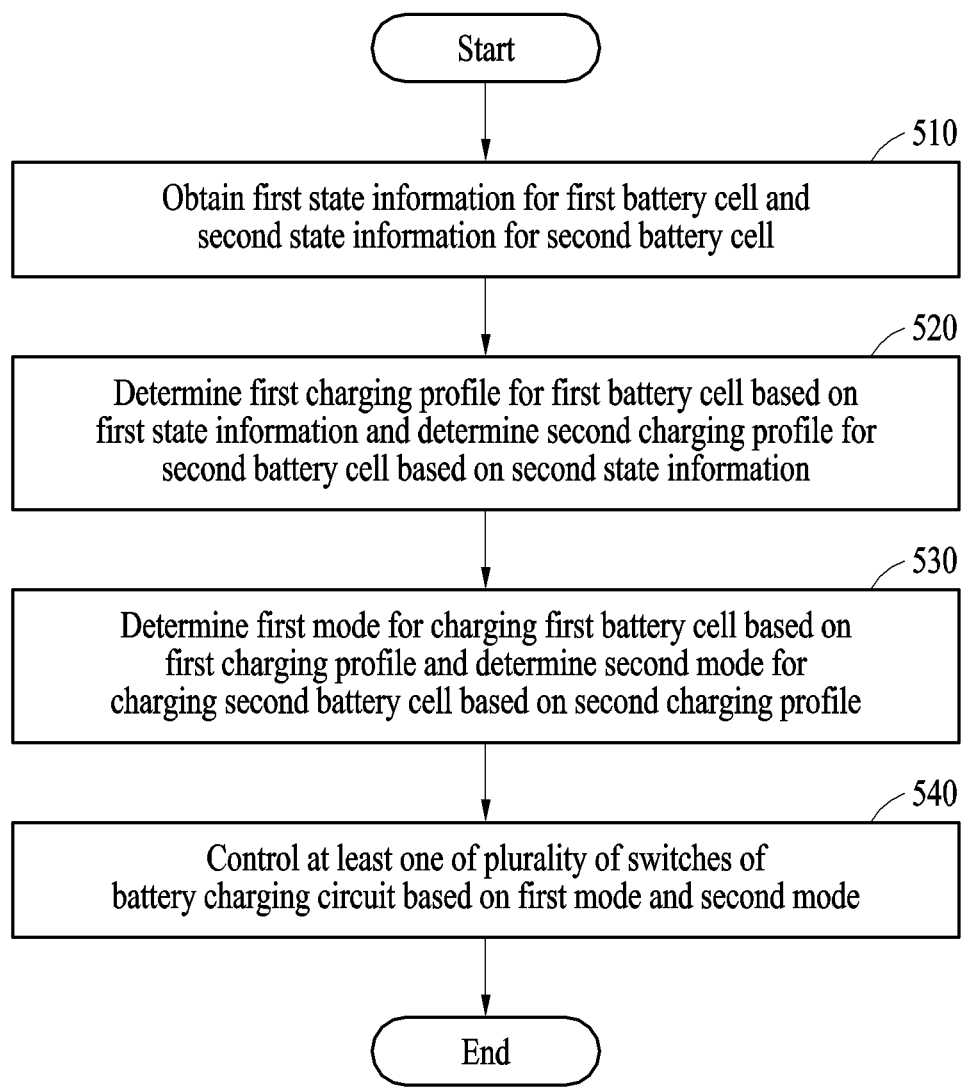
FIG. 5 illustrates an example of a method of controlling a battery charging circuit.

FIG. 5 illustrates an example of a method of controlling a battery charging circuit. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. In addition to the description of FIG. 5 below, the descriptions of FIGS. 1-4 are also applicable to FIG. 5, and are incorporated herein by reference. Thus, the above description may not be repeated here.

One or more blocks of FIG. 5, and combinations of the blocks, can be implemented by special purpose hardware-based computer, such as a processor, that perform the specified functions, or combinations of special purpose hardware and computer instructions. For example, operations 510 through 540 described below may be performed by the controller 300 described above with reference to FIG. 3.

In operation 510, the controller 300 may obtain first state information for the first battery cell 225 in FIG. 2 and second state information for the second battery cell 228 of the battery charging circuit 220 in FIG. 2. The first state information and the second state information may be an SOC that is a parameter indicating the SOC of a battery cell. The SOC may indicate an amount of energy stored in the battery cell, and the amount may be expressed in percent (%), for example, 0% to 100%. For example, 0% may indicate a fully discharged state, and 100% may indicate a fully charged state. Such a metric may be variously modified. The SOC may be estimated or measured using various schemes.

In an example, the controller 300 may estimate an internal state of the battery cell based on a battery model. Here, the battery model may be an electrochemical model to which aging parameters of the battery cell are applied to estimate state information of the battery cell by modeling physical phenomena such as potential and ion concentration distribution in the battery cell. In addition, the internal state of the battery cell may include any one or any combination of a cathode lithium-ion concentration distribution, an anode lithium-ion concentration distribution, an electrolyte lithium-ion concentration distribution, a cathode potential, and an anode potential of the battery cell. For example, the aging parameters may include any one or any combination of an electrode balance shift, a capacity for cathode active material, and an anode surface resistance of the battery cell, but are not limited thereto.

In operation 520, the controller 300 may determine a first charging profile for the first battery cell 225 based on the first state information, and a second charging profile for the second battery cell 228 based on the second state information.

In an example, a charging profile may be a profile based on a constant current-constant voltage (CC-CV) charging method.

In an example, the charging profile may be a profile based on a multi-step charging method.

In an example, the charging profile may be a profile based on a pulse charging method.

For example, the charging profile for the battery cell may be information for dividing the charging process of the battery cell into a plurality of charging stages (or steps) and charging the battery cell with a charging current and voltage corresponding to each charging stage. The charging profile for the battery cell may vary based on an overall capacity of the battery cell and materials included in the battery cell.

For each of the charging stages of the charging profile, a charging limit condition may be set that limits a charging of the battery cell as much as a target charging capacity during a target charging time. In addition, the charging limit condition may prevent aging of the battery cell.

For example, the charging limit condition may include internal state conditions of the battery 110 for the respective charging stages. The internal state conditions may be defined by the electrochemical model based on at least one internal state that affects the aging of the battery cell. The internal state conditions may include any one or any combination of an anode overpotential condition, a cathode overpotential condition, an anode surface lithium-ion concentration condition, a cathode surface lithium-ion concentration condition, a cell voltage condition, and an SOC condition for the battery cell.

Since the battery cell is aged when one of the internal state conditions is reached as the battery cell is being charged, the controller 300 may control the charging of the battery cell using the internal state conditions.

A charging profile for a plurality of battery cells is described in detail below with reference to FIG. 7.

In operation 530, the controller 300 may determine a first mode for charging the first battery cell 225 based on the first charging profile and determine a second mode for charging the second battery cell 228 based on the second charging profile.

A mode for charging the battery cell may be a mode for a charging current and voltage of a charging stage corresponding to a current SOC of the battery cell. For example, the determined mode may be a mode in which a current of a preset size is supplied or a mode in which a voltage of a preset size is supplied. As the battery cell is being charged, a charging stage corresponding to the current SOC may change, and a charging mode for the changed charging stage may be changed.

In operation 540, the controller 300 may control at least one of a plurality of switches of the battery charging circuit based on the first mode and the second mode.

The controller 300 may generate a first PWM signal for controlling the second switch 223 such that the first battery cell 225 of the battery charging circuit 220 is charged in the first mode, and the second switch 223 may be controlled based on the first PWM signal. When the second switch 223 operates with the first PWM signal, a current or voltage corresponding to the first mode may be applied to the first battery cell 225.

The controller 300 may generate a second PWM signal for controlling the third switch 226 such that the second battery cell 228 of the battery charging circuit 220 is charged in the second mode, and the third switch 226 may be controlled based on the second PWM signal. When the third switch 226 operates with the second PWM signal, a current or voltage corresponding to the second mode may be applied to the second battery cell 228.

The controller 300 may change a circuit structure connected with the first battery cell 225 and a circuit structure connected with the second battery cell 228, and control at least one of the plurality of switches 223, 226, 414, and 441 of the battery charging circuit 220. The first battery cell 225 and the second battery cell 228 may be simultaneously charged using each of the charging profiles by controlling the circuit structure of the first battery cell 255 and the circuit structure of the second battery cell 228. For example, when the fourth switch 441 is closed during charging, the first battery cell 225 and the second battery cell 228 may be connected in series. When battery cells (e.g., the first battery cell 225 and the second battery cell 228) are charged by the method described above, the battery cells may be charged rapidly, efficiently, and in a balanced manner.

Figure 6:
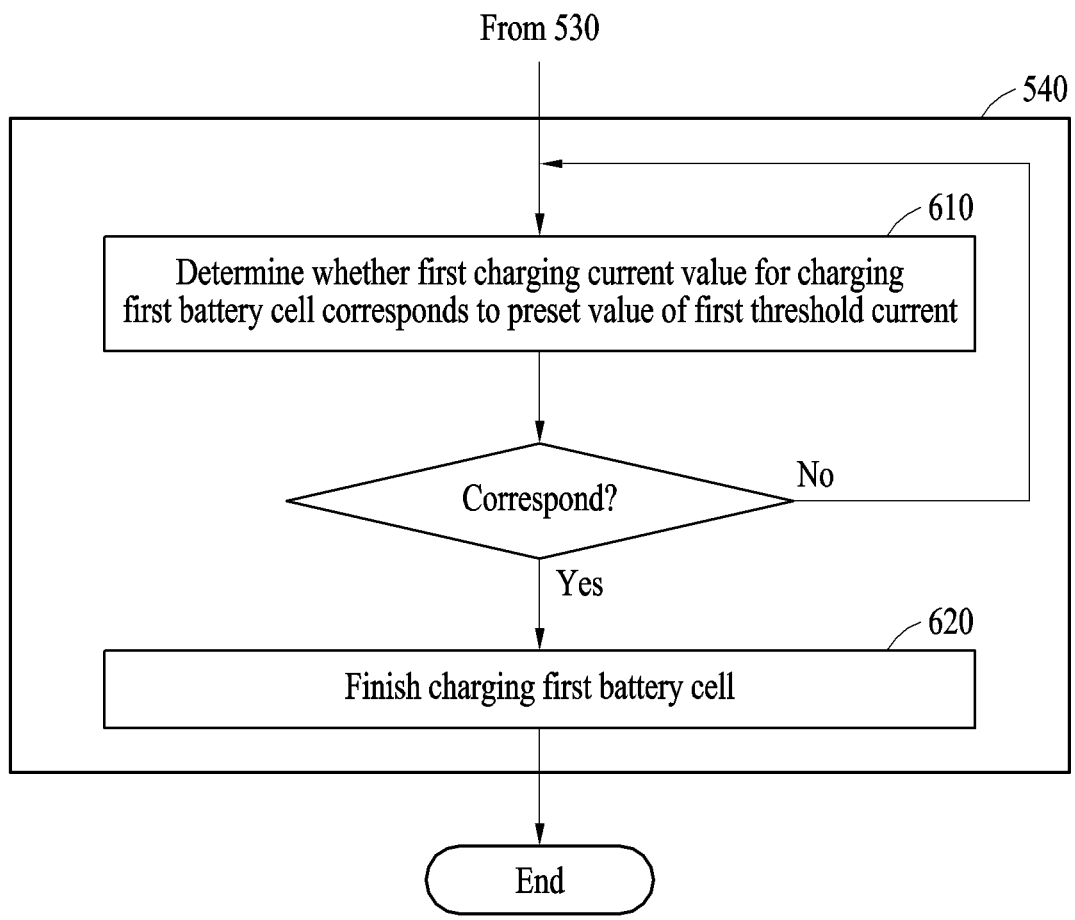
FIG. 6 illustrates an example of a method of finishing the charging of a battery cell.

FIG. 6 illustrates an example of a method of completing the charging of a battery cell. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

In an example, operation 540 described above with reference to FIG. 5 may further include operations 610 and 620, which are described below.

In operation 610, the controller 300 may determine whether a first charging current value for charging a first battery cell corresponds to a preset first threshold current value.

In operation 620, when the first charging current value corresponds to the first threshold current value, the controller 300 may finish charging the first battery cell. In an example, the value of the charging current applied to charge the battery cell decreases as the SOC increases. When the value of the applied charging current continuously decreases to reach the first threshold current value, it may be determined that the SOC of the battery cell is 100%.

Although a method of finishing the charging of the first battery cell is described with reference to operations 610 and 620 above, a method of finishing the charging of the second battery cell may also be described with reference to the operations 610 and 620 above.

Figure 7:
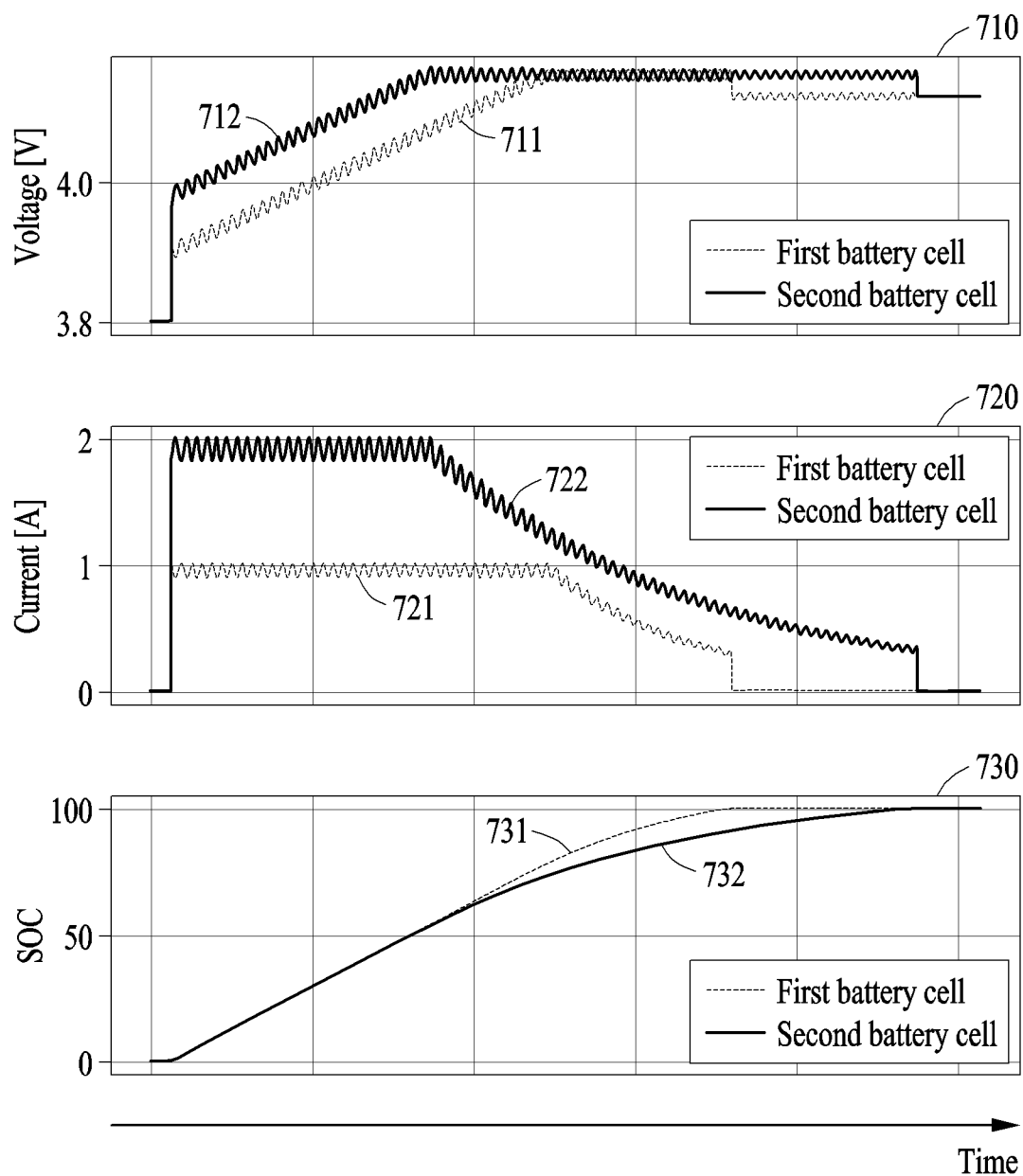
FIG. 7 illustrates examples of open circuit voltages (OCV), charging currents and states of charge (SOC) of battery cells during charging of the battery cells.

FIG. 7 illustrates examples of open circuit voltages (OCV), charging currents and states of charge (SOC) of battery cells during charging of the battery cells.

A graph 710 represents OCVs of battery cells based on a charging time, a graph 720 represents charging currents of the battery cells based on the charging time, and a graph 730 represents SOCs of the battery cells based on the charging time. Charging profiles for the battery cells may be represented by the graphs 710 and 720.

Generally, even when a battery cell that is a secondary battery is charged using a high current value at a low SOC, the battery cell may be charged using the high current value because an amount of aging of the battery cell is low. As the SOC increases, the amount of aging for the same current value may increase, and thus the battery cell may be charged using a current that has a gradually lowering value.

In an example, a plurality of stages may be set based on the SOC to charge the battery cell, and a current value may be assigned to be applied at each stage. A charging profile may be previously generated to efficiently charge battery cells during a target charging time. For example, the charging profile may be previously generated by a manufacturer of the battery cell. In another example, when the battery cell ages due to charging and discharging, the controller 300 may generate a modified charging profile for the aged battery cell using the initial charging profile and an electrochemical model.

As represented by graph 720, a charging profile 721 for the first battery cell indicates that a CC of 1 A is applied to the first battery cell at a low SOC, and a charging profile 722 for the second battery cell indicates that a CC 2 A is applied to the second battery cell at a low SOC. For example, when charging and discharging of battery cells is controlled such that the same or a similar SOC appears by balancing the battery cells, and the battery cells are charged from a fully discharged state, that is, 0% SOC, the controller 300 may generate a first PWM signal and a second PWM signal to apply 1 A to the first battery cell and 2 A to the second battery cell, and switches 223 and 226 of the battery charging circuit may be controlled using the first PWM signal and the second PWM signal. During charging, the switches 223 and 226 may be controlled based on the PWM signal such that currents corresponding to the charging profiles 721 and 722 are applied to the battery cells, respectively.

As represented by graph 730, an SOC 731 of the first battery cell and an SOC 732 of the second battery cell may be increased by a current applied to each of the battery cells. During charging, the controller 300 may estimate the SOC of the battery cells using the battery model and change a stage of the charging profiles 721 and 722 based on the estimated SOC.

As represented by the graph 710, at a low SOC, voltages of the battery cells may continuously increase while the battery cells are being charged. However, OCVs 711 and 712 of the battery cells maintaining voltages in a range may appear at the same or a higher SOC.

Although the charging profile of the battery cell adjusting an applied current for a plurality of stages is described with reference to FIG. 7, the same may also be described with reference to other examples, which are not limited to the ones described herein.

Figure 8:
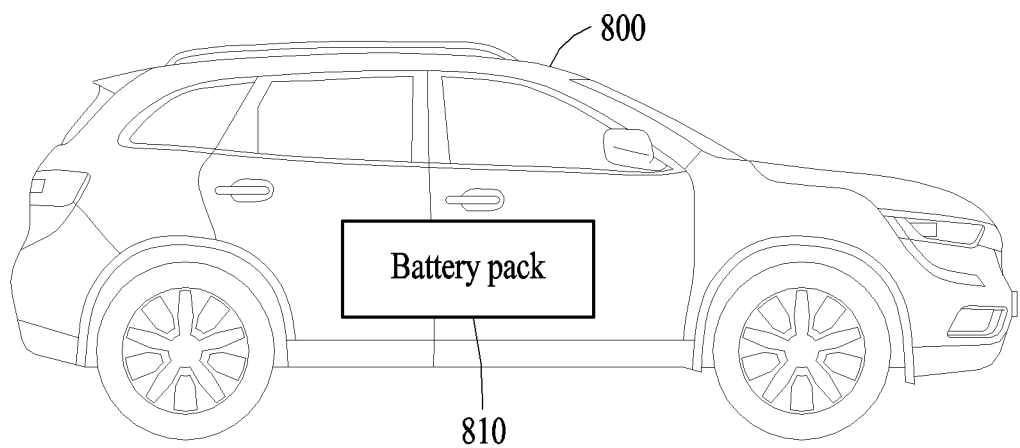
FIG. 8 illustrates an example of a vehicle.

FIG. 8 illustrates an example of a vehicle.

Referring to FIG. 8, a vehicle 800 may include a battery pack 810. The vehicle 800 may use the battery pack 810 as a power source. The vehicle 800 may be, for example, any mode of transportation, delivery, or communication such as, for example, for example, a truck, a tractor, a scooter, a motorcycle, a cycle, an amphibious vehicle, a snowmobile, a boat, a public transit vehicle, a bus, a monorail, a train, a tram, an automobile, an autonomous vehicle, an unmanned aerial vehicle, a drone, an autonomous vehicle, an electric vehicle or a hybrid vehicle.

The battery pack 810 may include a battery management system (BMS) and battery cells (or battery modules). The BMS may monitor whether the battery pack 810 shows an abnormality and prevent the battery pack 810 from being over-charged or over-discharged. The BMS may perform thermal control for the battery pack 810 when the temperature of the battery pack 810 is higher than a first temperature (e.g., 40° C.) or is lower than a second temperature (e.g., −10° C.). In addition, the BMS may perform cell balancing such that the battery cells in the battery pack 810 are in balanced charging states.

In an example, the vehicle 800 may include a battery charging device. The battery charging device may generate a charging profile of the battery pack 810 (or the battery cells in the battery pack 810), and charge the battery pack 810 (or the battery cells in the battery pack 810) using the generated charging profile.

The operations described above with reference to FIG. 8 are described in more detail above with reference to FIGS. 1 through 7. Thus, a more detailed description of the operations is not included here, for brevity.

Figure 9:
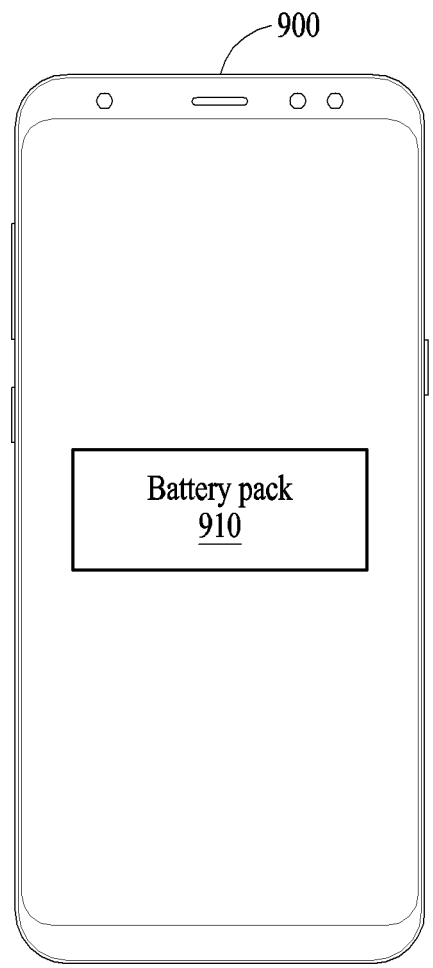
FIG. 9 illustrates an example of a mobile terminal.

FIG. 9 illustrates an example of a mobile terminal.

Referring to FIG. 9, a mobile terminal 900 may include a battery pack 910. The mobile terminal 900 may be a device that uses the battery pack 910 as a power source. The mobile terminal 900 may be a portable terminal, for example, a smart phone. The battery pack 910 may include a BMS and battery cells (or battery modules).

In an example, the mobile terminal 900 may include a battery charging device. The battery charging device may generate a charging profile of the battery pack 910 (or the battery cells in the battery pack 910), and charge the battery pack 910 (or the battery cells in the battery pack 910) using the generated charging path.

The operations described above with reference to FIG. 9 are described in more detail above with reference to FIGS. 1 through 8. Thus, a more detailed description of the operations is not included here, for brevity.

Figure 10:
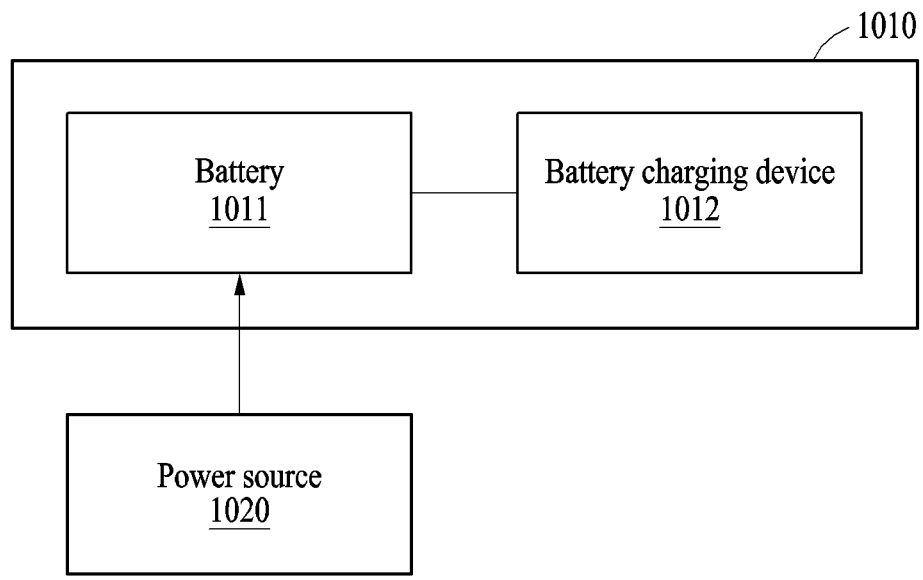
FIG. 10 illustrates an example of an electronic device.

FIG. 10 illustrates an example of an electronic device.

Referring to FIG. 10, a terminal 1010 may include a battery 1011 and a battery charging device 1012. The terminal 1010 may be a mobile terminal such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera portable game console, an MP3 player, a portable/personal multimedia player (PMP), a handheld e-book, an ultra-mobile personal computer (UMPC), a portable lab-top PC, a global positioning system (GPS) navigation, a personal navigation device, portable navigation device (PND), a handheld game console, an e-book, a high definition television (HDTV), a smart appliance, communication systems, image processing systems, graphics processing systems, various Internet of Things (IoT) devices that are controlled through a network, and other consumer electronics/information technology (CE/IT) devices. The battery charging device 1012 may be in a form of an integrated circuit (IC), but is not limited thereto. The battery charging device 1012 may receive power from a power source 1020 in a wired or wireless manner and charge the battery 1011 based on the power. The battery charging device 1012 may generate a charging profile for the battery 1011 and charge the battery 1011 using the charging profile.

The operations described above with reference to FIG. 10 are described in more detail above with reference to FIGS. 1 through 9. Thus, a more detailed description of the operations is not included here, for brevity.

The battery charging device 120, first low-pass filter 224, second switch 223, third switch 226, second low-pass filter 227, DC/DC converter 222, balancing circuit 229, controller 300, communicator 310, sensor 401, protection switch 402, circuit protection module 403, first switch 414, and other apparatuses, devices, units, modules, and components described herein with respect to FIGS. 3 through 6 and FIGS. 2 and 8 through 10 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, controller, arithmetic logic unit (ALU), a DSP, a microcomputer, application-specific integrated circuit (ASIC), field programmable gate array (FPGA), programmable logic unit (PLU), central processing unit (CPU), graphics processing unit (GPU), neural processing unit (NPU), or any other device capable of responding to and executing instructions in a defined manner.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of controlling a battery charging circuit connected to a plurality of battery cells for charging the plurality of battery cells. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of charging a plurality of battery cells by controlling a battery charging circuit connected to the plurality of battery cells, the method comprising:
   obtaining first state information for a first battery cell of the plurality of battery cells and second state information for a second battery cell of the plurality of battery cells;
   determining a first charging profile for the first battery cell based on the first state information and determining a second charging profile for the second battery cell based on the second state information;
   determining a first mode for charging the first battery cell based on the first charging profile and determining a second mode for charging the second battery cell based on the second charging profile; and
   controlling the battery charging circuit by controlling at least one of a first switch, a second switch, a third switch, and a fourth switch based on the first mode and the second mode,
   wherein the battery charging circuit comprises:
     the first switch being connected in series between a first pole of a power supply and a first pole of the first battery cell;
     the second switch being connected in parallel between the first pole of the first battery cell and a second pole of the first battery cell, the second switch being configured to adjust a size of a current applied to the first battery cell;
     the third switch being connected in series with the second switch and in parallel between a first pole of the second battery cell and a second pole of the second battery cell, the third switch being configured to adjust a size of a current applied to the second battery cell, the third switch connecting in series the second pole of the first battery cell and a ground connected to the second pole of the second battery cell, and a second pole of the power supply connected to the ground; and
     the fourth switch being connected in series between the second pole of the first battery cell and the first pole of the second battery cell.

2. The method of claim 1, wherein the obtaining each of the first state information for the first battery cell and the second state information for the second battery cell comprises obtaining the first state information by modeling a physical phenomenon in the first battery cell and the second battery cell, respectively, using a battery model.

3. The method of claim 1, further comprising:
   dividing a charging process of the first battery cell into charging stages,
   wherein the first charging profile comprises information for charging the first battery cell with at least one of a charging current or a charging voltage corresponding to each charging stage of the charging stages.

4. The method of claim 1, wherein the controlling of the battery charging circuit comprises:

generating a first pulse width modulation (PWM) signal to control the second switch such that the first battery cell is charged in the first mode; and
controlling the second switch based on the first PWM signal.

5. The method of claim 1, wherein the controlling of the battery charging circuit comprises:
   determining whether a first charging current value for charging the first battery cell corresponds to a first threshold current value; and
   terminating charging of the first battery cell, in response to the first charging current value corresponds to the preset first threshold current value.

6. The method of claim 1, further comprising:
   generating circuit safety information by measuring at least one of a current, a voltage, and a temperature applied to the battery charging circuit using at least one sensor; and
   opening the battery charging circuit through a protection switch of the battery charging circuit, in response to the circuit safety information being greater than a threshold.

7. The method of claim 1, wherein the battery charging circuit further comprises the third switch connecting in series the first switch and the ground.

8. The method of claim 1, wherein the adjustment of the size of the current applied to the first battery cell, with the first switch being connected in parallel between the first pole of the first battery cell and the second pole of the first battery cell, comprises applying a first current to the first battery cell according to a first duty ratio that is dependent on a first signal controlling the first switch, and applying a different second current to the first battery cell according to a different second duty ratio that is dependent on a different second signal controlling the first switch.

9. A battery charging device, comprising:
   a battery charging circuit connected to a first battery cell and a second battery cell; and
   a controller configured to control the battery charging circuit, wherein the battery charging circuit comprises:
     a first switch connected in series between a first pole of a power supply and a first pole of the first battery cell;
     a second switch connected in parallel between the first pole of the first battery cell and a second pole of the first battery cell configured to adjust a size of a current applied to the first battery cell;
     a third switch connected in series with the second switch and in parallel between a first pole of the second battery cell and a second pole of the second battery cell, the third switch being configured to adjust a size of a current applied to the second battery cell, the third switch connecting in series between the second pole of the first battery cell and a ground connected to the second pole of the second battery cell and a second pole of the power supply connected to the ground; and
     a fourth switch connected in series between the second pole of the first battery cell and the first pole of the second battery cell.

10. The battery charging device of claim 9, wherein the controller comprises a microprocessor.

11. The battery charging device of claim 9, wherein the first battery cell and the second battery cell are heterogeneous.

12. The battery charging device of claim 11, wherein the first battery cell and the second battery cell each have a different capacity.

13. The battery charging device of claim 9, wherein the first battery cell and the second battery cell are connected in series by the fourth switch closing during charging.

14. The battery charging device of claim 13, wherein a voltage applied to both poles of the power supply is a sum of a voltage of the first battery cell and a voltage of the second battery cell, in response to the first battery cell and the second battery cell being connected in series.

15. The battery charging device of claim 9, wherein the controller is configured to:
generate a first pulse width modulation (PWM) signal configured to charge the first battery cell and a second PWM signal configured to charge the second battery cell; and
independently control the second switch and the third switch based on the first PWM signal and the second PWM signal.

16. The battery charging device of claim 15, wherein the battery charging circuit further comprises:
a first low-pass filter configured to reduce a voltage ripple that appears by the second switch being controlled based on the first PWM signal, the first low-pass filter comprising a coil and a capacitor.

17. The battery charging device of claim 16, wherein the first low-pass filter further comprises a diode configured to prevent a reverse current.

18. The battery charging device of claim 15, wherein the battery charging circuit further comprises:
a protection switch;
at least one sensor configured to generate circuit safety information by measuring at least one of a current, a voltage, or a temperature applied to the battery charging circuit; and
a circuit protection module configured to open the battery charging circuit through the protection switch, in response to the circuit safety information being greater than a threshold.

19. The battery charging device of claim 9, wherein the battery charging circuit further comprises a balancing circuit for the first battery cell and the second battery cell,
wherein the balancing circuit comprises:
a first balance diode connected to the first battery cell;
a second balance diode connected to the second battery cell; and
a load,
wherein the controller is configured to control the first balance diode and the second balance diode through a diode enable signal.

20. The battery charging device of claim 9, wherein the battery charging device is comprised in a vehicle or a mobile terminal.

* * * * *